(12) United States Patent
Lind et al.

(10) Patent No.: US 10,432,097 B2
(45) Date of Patent: Oct. 1, 2019

(54) SELECTION CONTROL FOR TRANSFORMER WINDING INPUT IN A POWER CONVERTER

(71) Applicant: Infineon Technologies Austria AG, Villach (AT)

(72) Inventors: Anders Lind, San Jose, CA (US); Andrey Malinin, Fort Collins, CO (US)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 15/827,194

(22) Filed: Nov. 30, 2017

(65) Prior Publication Data

US 2019/0165685 A1 May 30, 2019

(51) Int. Cl.
*H02M 3/335* (2006.01)
*H02M 1/08* (2006.01)
(Continued)

(52) U.S. Cl.
CPC ......... *H02M 3/33523* (2013.01); *H02M 1/08* (2013.01); *H02M 1/143* (2013.01); *H02M 3/33569* (2013.01); *H02M 2001/0032* (2013.01)

(58) Field of Classification Search
CPC ................... H02M 1/143; H02M 1/08; H02M 2001/0032; H02M 2001/0035;
(Continued)

(56) References Cited

U.S. PATENT DOCUMENTS 5,640,310 A  6/1997 Yasumura
5,867,374 A  2/1999 Moreau
(Continued)

FOREIGN PATENT DOCUMENTS

CN  201226496 Y  4/2009
CN  105375800 A  3/2016
(Continued)

OTHER PUBLICATIONS

Bai, Yongjiang et al., "A Novel Constant Voltage Primary-side Regulation Topology to Eliminate Auxiliary Winding", 2016 IEEE Energy Conversion Congress and Exposition (ECCE), Sep. 2016, pp. 1-6.
(Continued)

*Primary Examiner* — Alex Torres-Rivera
(74) *Attorney, Agent, or Firm* — Murphy, Bilak & Homiller, PLLC

(57) ABSTRACT

Circuits and methods are provided for supplying power to a transformer of a switching DC/DC voltage converter within a power converter. The power converter includes separate nodes that can potentially supply such power. A first of these nodes is coupled, typically directly and with no energy-storing bulk capacitor, to a rectifier that supplies rectified power from an alternating current power source. A second node is also supplied power from the rectifier, but is coupled to a bulk capacitor that can store and supply energy as needed. The techniques disclosed herein use the first node to supply power to the transformer when feasible, and use the second node, and its associated bulk capacitor, to supply power otherwise. In so doing, the energy storage requirements of the bulk capacitor may be reduced, meaning that the capacitance and associated size of the bulk capacitor may be reduced relative to other power converter circuits.

14 Claims, 9 Drawing Sheets

(51) Int. Cl.
*H02M 1/14* (2006.01)
*H02M 1/00* (2006.01)

(58) Field of Classification Search
CPC ........... H02M 3/337; H02M 2001/322; H02M 2001/342; H02M 2001/344
USPC ........ 363/15, 16, 21.01, 21.02, 21.04–21.05, 363/21.1, 21.12, 21.13, 21.18
See application file for complete search history.

(56) References Cited

U.S. PATENT DOCUMENTS

| | | | |
|---|---|---|---|
| 6,061,253 A * | 5/2000 | Igarashi | H02M 1/34 363/19 |
| 7,911,808 B2 | 3/2011 | Huynh et al. | |
| 9,445,468 B1 * | 9/2016 | Cheng | H02M 1/4258 |
| 2003/0043600 A1 * | 3/2003 | Morita | H02M 1/34 363/21.01 |
| 2004/0156217 A1 * | 8/2004 | Phadke | H02M 3/33569 363/21.16 |
| 2005/0030772 A1 | 2/2005 | Phadke | |
| 2005/0226008 A1 | 10/2005 | Harada et al. | |
| 2008/0309303 A1 | 12/2008 | Morota et al. | |
| 2011/0032731 A1 | 2/2011 | Coleman et al. | |
| 2011/0222319 A1 | 9/2011 | Marumo et al. | |
| 2012/0014141 A1 * | 1/2012 | Nania | H02M 1/36 363/21.09 |
| 2013/0235623 A1 | 9/2013 | Huang | |
| 2016/0301316 A1 * | 10/2016 | Nielsen | H02M 3/33507 |
| 2016/0322967 A1 * | 11/2016 | Inakagata | H02M 3/33569 |

FOREIGN PATENT DOCUMENTS

| | | |
|---|---|---|
| EP | 2058933 A2 | 5/2009 |
| JP | 2002034255 A | 1/2002 |
| WO | 0008742 A1 | 2/2000 |

OTHER PUBLICATIONS

Lind, Anders, "Power Converter with Selective Transformer Winding Input", U.S. Appl. No. 15/815,272, filed Nov. 16, 2017.

* cited by examiner

SELECTION CONTROL FOR TRANSFORMER WINDING INPUT IN A POWER CONVERTER

TECHNICAL FIELD

The present application relates to power converters and, in particular, relates to circuits comprising a first rectified voltage node having no bulk capacitor and a second rectified voltage node coupled to a bulk capacitor, and to controlling a selection of whether the first rectified voltage node or the second rectified voltage node or both are used for supplying power to a transformer.

BACKGROUND

Line power converters input alternating current (AC) power and convert it into direct current (DC) power for supplying a load, e.g., charging batteries in smart phones, laptops, or other portable devices, or for otherwise powering an electronic device. Such power converters typically include an input stage, which converts an input AC voltage into an intermediate voltage that is DC, and a switching DC/DC voltage converter, which converts the intermediate DC voltage into an output DC voltage level that is appropriate for powering the load.

Power converters limited to low or moderate power requirements, e.g., below an input power of 75 W, typically require no power factor correction. The input stage for such power converters typically includes a protection circuit, an electromagnetic interference (EMI) filter, a bridge rectifier, and a bulk capacitor. The EMI filter and the protection circuit are connected to an input power source, such as an AC line voltage provided by an electrical mains. The output of the protection circuit and the EMI filter is provided to a rectifier, such as a diode-based bridge rectifier, that outputs a rectified voltage. The rectified voltage is coupled to the bulk capacitor, which stores energy and smoothes the rectified (DC) voltage. More particularly, this smoothed voltage may be characterized as having an average (DC) value with a ripple superimposed on it, wherein the ripple frequency is related to a frequency of the AC power source (e.g., 50 Hz, 60 Hz) and the ripple magnitude is largely determined by the value of the bulk capacitor.

The intermediate DC voltage is input to the switching DC/DC voltage converter. The DC/DC voltage converter includes a transformer comprised of primary and secondary windings. One or more power switches switchably couple the intermediate DC voltage onto the primary winding(s) of the DC/DC voltage converter, thereby producing an AC voltage across the primary winding(s). This induces an AC voltage on the secondary winding(s) of the DC/DC voltage converter. The secondary-side voltage and current are rectified and filtered before being provided to the power converter load. The DC/DC voltage converter operates optimally when its input intermediate DC voltage is constant. In practice, the bulk capacitance is chosen so as to constrain the ripple of the intermediate DC voltage to be within an acceptably narrow range. The DC/DC voltage converter may specify an acceptable voltage range for this input, or may specify a minimum allowed input voltage.

Power converters configured to work with various AC mains voltage levels, i.e., universal input converters, require a bulk capacitor capable of handling fairly large voltages. For example, a capacitor voltage rating of 400V may be necessary to handle line voltages of 340V peak (240 $V_{RMS}$), as used in much of the world, together with some margin for lightning surges, etc. The bulk capacitor must also have a fairly large capacitance so as to meet the input voltage requirements (voltage ripple and/or minimum voltage) of the DC/DC voltage converter. For example, a capacitance of 1.5 to 2.0 µF per Watt of power rating for the power converter may be required.

The physical size (volume and printed circuit board footprint) of the bulk capacitor within a typical power converter is quite large due to its required capacitance and maximum voltage ratings. The size requirements for DC/DC voltage converters are on a gradual downward trajectory, as their constituent components, e.g., transformer, capacitors, inductors, may be reduced in size as the switching frequency of DC/DC voltage converters increases. However, such scaling does not apply to the bulk capacitor, as the input voltage frequency is fixed to that provided by the power source, e.g., the mains voltage. The bulk capacitor already consumes a large portion of the overall volume for a power converter, and this portion is increasing due to the gradually decreasing size requirements for the DC/DC voltage converter.

One technique for reducing the capacitance of the bulk capacitor is to include a non-isolated boost converter that pre-regulates the input voltage to a much higher voltage (e.g., 400V) that is fed to the DC/DC voltage converter. This is the approach taken by power factor correction (PFC) converters. Because a much higher voltage is provided to the DC/DC voltage converter, a smaller bulk capacitor may be used while still meeting minimum voltage input requirements of the DC/DC voltage converter. However, such an approach has drawbacks in terms of efficiency, as the added conversion stage has associated power loss. Furthermore, the boost converter employs a fairly large input inductor, which largely negates any size reduction of the bulk capacitor. Hence, the complexity and size of an added input stage, e.g., a boost or other PFC converter, makes such approaches undesirable, at least for lower-power converters that do not require PFC.

Circuits and associated techniques are desired that would allow for a reduction in the bulk capacitor used within power converters.

SUMMARY

According to an embodiment of a power converter, the power converter includes a rectifier, a bulk capacitor, a transformer having a primary-side winding, first and second switches, and a controller. The rectifier is configured to input alternating current (AC) power from an input power source and to supply power to a rectified voltage node having a rectified voltage. The bulk capacitor is supplied power from the input power source, e.g., via the rectified voltage node or directly from the input power source via diodes, and has an associated storage voltage. The first and second switches are configured to supply power to the primary-side winding. The first switch supplies power from the rectified voltage node, whereas the second switch supplies power from the bulk capacitor. The controller provides control signals to the first and second switches so as to control the power provided to the primary-side windings. The controller determines whether to switch the first switch, the second switch, or both switches based upon at least one of the rectified voltage and the storage voltage.

According to an embodiment of a method, the method provides techniques for controlling a power converter that comprises a rectifier configured to input alternating current (AC) power from an input power source and supply power to a rectified voltage node having a rectified voltage node, a bulk capacitor that is supplied power from the input power source and has a storage voltage, a transformer comprising a primary-side winding, a first switch configured to provide power to the primary-side winding from the rectified voltage node, and a second switch configured to provide power to the primary-side winding from the bulk capacitor. The method begins by sensing at least one of the rectified voltage and the storage voltage. Next, it is determined whether the first switch, the second switch, or both switches will be switched, based upon the sensed rectified voltage and/or the sensed storage voltage. Control signals are generated and provided to the determined switches so as to provide power to the primary-side winding.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments may be combined unless they exclude each other. Embodiments are depicted in the drawings and are detailed in the description that follows.

DETAILED DESCRIPTION

Figure 1:
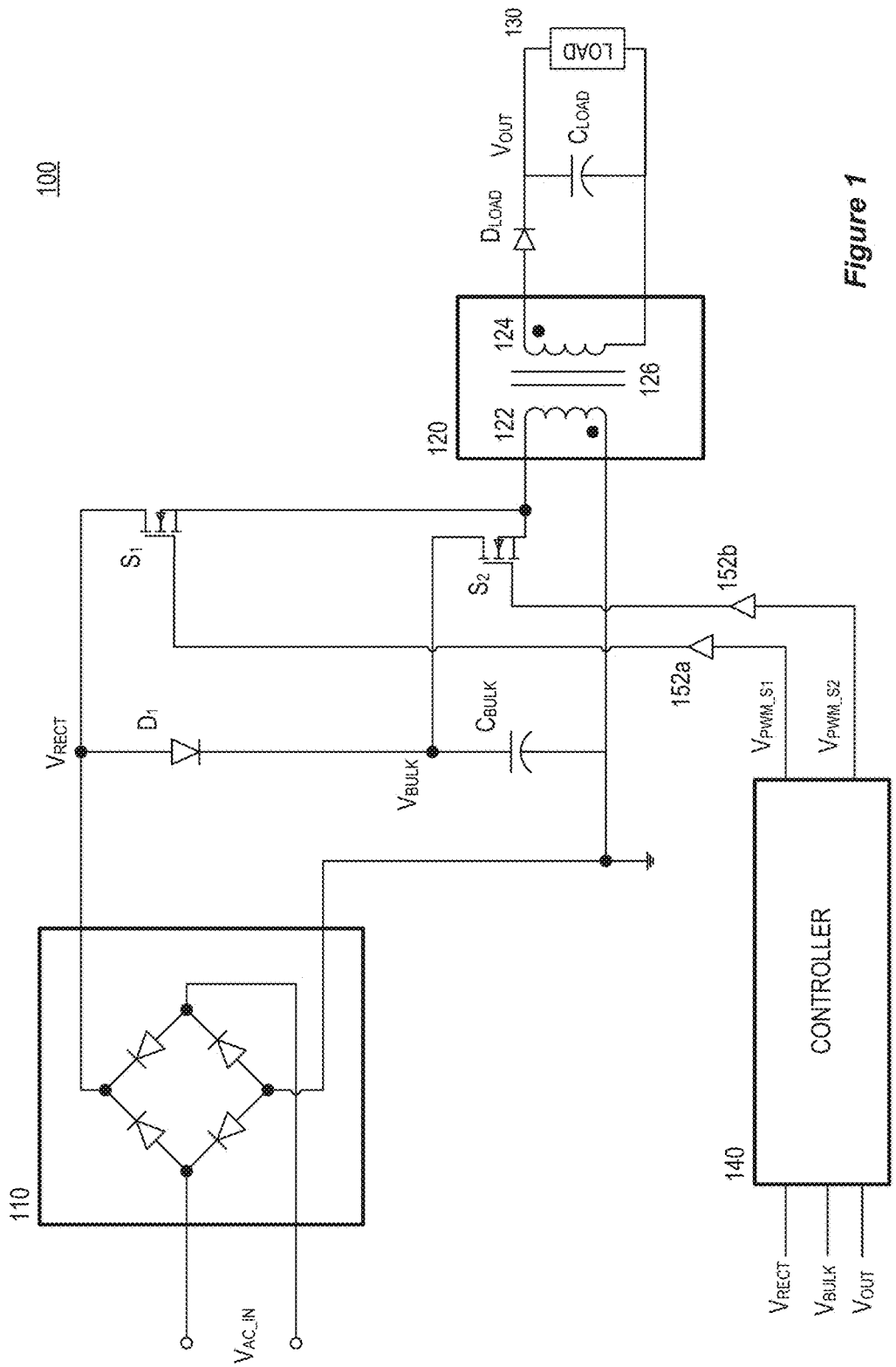
FIG. 1 illustrates a schematic diagram of a power converter having a primary-side winding that is supplied power from one or both of two different voltage nodes.

The embodiments described herein provide circuits and methods that enable a reduction in size for a bulk capacitor within a power converter that is comprised of an input stage and a switching DC/DC voltage converter. This size reduction is realized by decreasing the required capacitance and/or voltage rating of the bulk capacitor, while still meeting input voltage requirements for the switching DC/DC voltage converter. Described below are circuit topologies, together with techniques for controlling such circuit topologies, that enable such a reduction in capacitance and/or voltage rating. Unlike conventional power converters that couple a rectifier output to a bulk capacitor and to a power stage input of a switching DC/DC voltage converter, the circuits described herein include both a first rectified voltage node, which cannot be powered from the bulk capacitor, and a second rectified voltage node, which is coupled to and can be powered from the bulk capacitor. Voltages corresponding to one or both of the first and second rectified voltage nodes are measured and used to determine whether power from the first rectified voltage node, the second rectified voltage node, or both should be provided to the transformer of the switching DC/DC voltage converter.

The switching DC/DC voltage converter includes a transformer having primary and secondary-side windings. A first power switch is configured to switchably couple the first rectified voltage node to the primary-side winding. A second power switch is configured to switchably couple the second rectified voltage node to the primary-side winding. A controller determines whether the first power switch, and its associated first rectified voltage node, or the second power switch, and its associated second rectified voltage node, or both should supply power to the primary-side winding. Such determination is based upon a voltage measured at the first rectified voltage node and/or a voltage measured at the second rectified voltage node. In a preferred embodiment, the first power switch and the first rectified voltage node are selected to power the primary-side winding when the measured voltage of the first rectified voltage node is above a minimum voltage threshold. Otherwise, the controller determines which of the first and second voltage nodes has a higher measured voltage, and selects the associated power switch to provide power to the primary-side winding. In a typical case, when the measured voltage at the rectified voltage node is below the minimum voltage threshold, the controller will switch the second switch thereby supplying power to the primary-side winding from the energy stored in the bulk capacitor. Once this determination is made, the controller switches the selected power switch in order to meet the power requirements for a load of the power converter.

The inventive techniques may be applied to a variety of power converters that rely upon switched DC/DC voltage conversion. For ease of explanation, the inventions are described by way of particular examples in the context of a flyback converter. One skilled in the art will recognize that the techniques are readily extrapolated to other power converter topologies, such as forward converters, and other variants, such as quasi-resonant (QR) converters and active clamp converters. The controller in the examples described below is located on the primary side of the controller, but the controller could be located on the secondary side. This would require modifications such as isolation circuits, as are known in the art. Furthermore, the described circuits include a transformer having a primary and a secondary-side winding. The control techniques described herein may also be applied to other transformer configurations including, e.g., transformers including multiple primary-side windings, multiple secondary-side windings, and/or one or more auxiliary windings.

It should be understood that the particular examples described below are not meant to be limiting. Circuits and techniques that are well-known in the art are not described in detail, so as to avoid obscuring the unique aspects of the invention. Features and aspects from the example embodiments may be combined or re-arranged, except where the context does not allow this.

Power Converter with Separate Voltage Nodes to Power Primary-Side Winding

FIG. 1 illustrates an embodiment of a forward power converter 100. This power converter 100 differs from conventional power converters in that it includes a first rectified voltage node, denoted $V_{RECT}$, and a second rectified voltage node, denoted $V_{BULK}$. The first rectified voltage node $V_{RECT}$ is coupled directly to a bridge rectifier 110, and is not coupled to an energy-storage component, such as a bulk capacitor, that is capable of supplying substantial energy to the first rectified voltage node. (A filter capacitor, having a relatively small capacitance and having a primary function of reducing high-frequency noise, is not considered a bulk capacitor in this context.) The second rectified voltage node $V_{BULK}$ is also supplied power from the bridge rectifier 110, but is coupled to a bulk capacitor $C_{BULK}$ which serves as an energy-storage component. A controller 140 determines which of the rectified voltage nodes $V_{RECT}$, $V_{BULK}$ should be coupled to the primary side of a transformer 120 when the DC/DC voltage converter is switched. By using the first rectified voltage node $V_{RECT}$ whenever it is capable of meeting minimum voltage requirements for the switching DC/DC voltage converter, the power converter 100 is less reliant on the second rectified voltage node $V_{BULK}$ and the energy stored in the bulk capacitor $C_{BULK}$. This, in turn, means that the capacitance and associated size of the bulk capacitor $C_{BULK}$ may be reduced relative to power converters that do not include or use a first rectified voltage node such as the node $V_{RECT}$ within FIG. 1. With these unique features of the power converter 100 summarized above, the power converter 100 of FIG. 1 will now be described in further detail.

The power converter 100 includes a bridge rectifier 110, a transformer 120, power switches $S_1$ and $S_2$, and a controller 140. The power converter 100 supplies power to a load 130 on the secondary side of the transformer 120.

The rectifier 110 inputs power from an AC power source, denoted $V_{AC\_IN}$, such as a mains supply. The illustrated rectifier 110 is arranged as a conventional diode bridge, though other arrangements are possible, such as active rectification based upon power switches rather than diodes. The rectifier 110 outputs a rectified voltage at a first rectified voltage node $V_{RECT}$. The first rectified voltage node $V_{RECT}$ is coupled to a diode $D_1$ which, in turn, is coupled to the bulk capacitor $C_{BULK}$ at a second rectified voltage node, denoted $V_{BULK}$. The diode $D_1$ allows current (power) to flow from the bridge rectifier 110 and the first rectified voltage node $V_{RECT}$ to the bulk capacitor $C_{BULK}$ and its voltage node $V_{BULK}$, but does not allow energy to be drained from the bulk capacitor $C_{BULK}$ back to the first rectified voltage node $V_{RECT}$. In this way, the diode $D_1$ charges the bulk capacitor $C_{BULK}$ whenever the voltage at the first rectified voltage node $V_{RECT}$ is sufficiently higher than the voltage at the second rectified voltage node $V_{BULK}$.

The transformer 120 includes a primary-side winding 122, a secondary-side winding 124, and a core 126. The first rectified voltage node $V_{RECT}$ is switchably coupled to the primary-side winding 122 via a first power switch $S_1$, whereas the second rectified voltage node $V_{BULK}$ is switchably coupled to the primary-side winding 122 via a second power switch $S_2$. Current flow through the primary-side winding 122 is controlled by the first power switch $S_1$ and/or the second power switch $S_2$. For this embodiment, the control, e.g., switching duty cycle or frequency, of each of the power switches $S_1$, $S_2$ may use conventional techniques, but novel techniques are used to select which of the power switches $S_1$, $S_2$ should be actively used and, related, which of the voltage nodes $V_{RECT}$, $V_{BULK}$ should provide power to the transformer 120. Such selection techniques are detailed in the descriptions of the controller 240 and its variants, which are found further below.

The power switches $S_1$, $S_2$ illustrated in FIG. 1 are enhancement-mode metal-oxide semiconductor field-effect transistors (MOSFETs), but other switch types may be used. For example, junction field-effect transistors (JFETs), bipolar junction transistors (BJTs), insulated gate bipolar transistors (IGBTs), high electron mobility transistors (HEMTs), or other types of power transistors may be preferred in some applications. The power switches $S_1$, $S_2$ may be integrated on the same semiconductor die, may each be provided on separate dies, or may otherwise be spread across a plurality of semiconductor dies. Drivers 152a, 152b provide control signals to the control terminals, e.g., MOSFET gates, of the power switches $S_1$, $S_2$.

Power flow through the primary-side winding 122 is magnetically coupled to the secondary-side winding 124 via the transformer core 126. A voltage induced across the secondary-side winding 124 is rectified by a diode $D_{LOAD}$ and filtered by a load capacitor $C_{LOAD}$. The resultant voltage $V_{OUT}$ is provided to the load 130 of the power converter 100.

The controller 140 is responsible for controlling the power converter 100 so as to supply the necessary power (voltage $V_{OUT}$ and current) to the load 130. This includes generating pulse-width-modulated (PWM) signals $V_{PWM\_S1}$, $V_{PWM\_S2}$ that control the power switches $S_1$, $S_2$ via the drivers 152a, 152b. Conventional control techniques are used to generate each of these PWM waveforms, based upon load requirements. The controller senses the output voltage $V_{OUT}$, the rectified voltage $V_{RECT}$, and a storage voltage $V_{BULK}$ of the bulk capacitor. The controller 140 selects which of the PWM signals $V_{PWM\_S1}$, $V_{PWM\_2}$ to generate based upon these sensed voltages.

Figure 2:
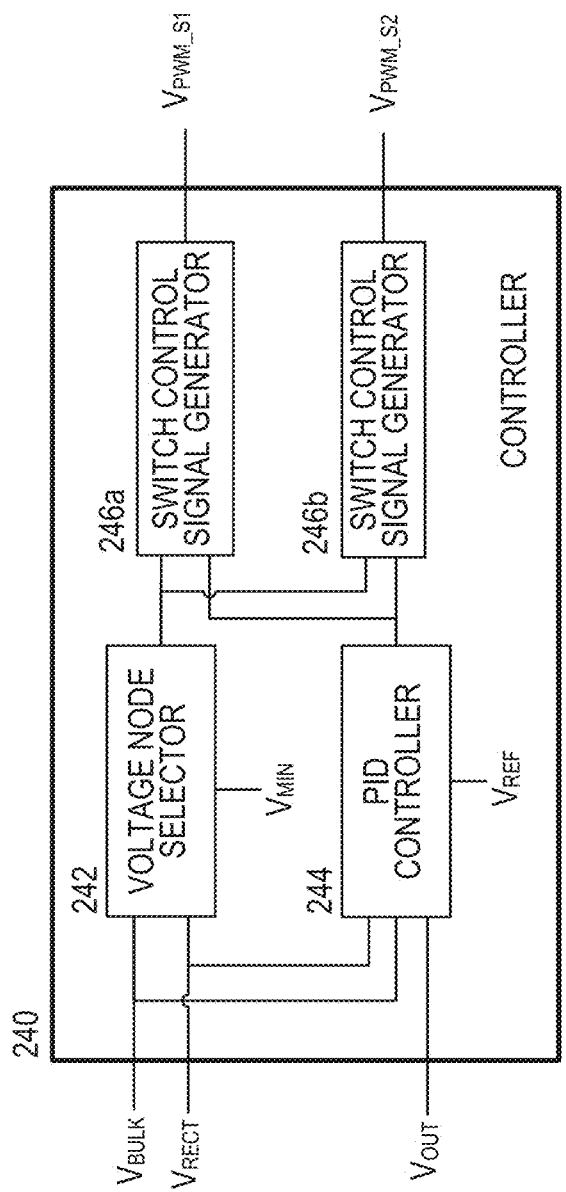
FIG. 2 illustrates a controller for a power converter such as the power converter of FIG. 1.

FIG. 2 illustrates an embodiment of a controller 240 for generating PWM signals $V_{PWM\_S1}$, $V_{PWM\_S2}$. The controller 240 includes switch control signal generators 246a, 246b that may generate PWM signals using a fixed switching frequency and a variable duty cycle. The duty cycle varies to adjust the power transfer across the transformer 120 to match the power needs of the load 130. This may be accomplished, e.g., using a proportional-integral-derivative (PID) controller 244. The PID controller 244 inputs a measured (sensed) voltage corresponding to the load voltage $V_{OUT}$, and varies the duty cycle(s) to maintain the load voltage $V_{OUT}$ as close as feasible to a desired reference voltage $V_{REF}$. Additionally, the PID controller 244 may adjust the duty cycle(s) based upon the voltage, e.g., $V_{RECT}$, $V_{BULK}$, that is being provided to the primary-side winding. For example, the duty cycle for a particular switching cycle may need to be increased if the provided voltage has decreased relative to a previous switch cycle. Conversely, the duty cycle may need to be reduced if the provided voltage is higher than that of a previous switching cycle. The PID controller 244 provides the duty cycle(s) to the switch control signal generators 246a, 246b, which use the duty cycle(s) to generate the PWM signals $V_{PWM\_S1}$, $V_{PWM\_S2}$. Operation of PID controllers for generating duty cycles for power converter switches, including techniques for making adjustments based upon an input voltage, are well-known in the art and will not be further detailed herein.

Other techniques may be used for controlling the power switches $S_1$, $S_2$. For example, PWM waveforms using a variable frequency and a fixed duty cycle may be used. Other power converter topologies, e.g., half-bridge, full-bridge, push-pull, may require additional power switches and associated control relative to the flyback power converter 100 illustrated within FIG. 1. While the controller 140 is illustrated as being on the primary side of the power converter 100, a similar power converter could locate a similar controller on the secondary side. Switch control techniques for other power converter topologies are well-known and will not be further explained herein, other than to note that the unique inventive techniques described within a voltage node selector 242 may be similarly applied to other power converter topologies.

The controller 240 also includes the voltage node selector 242, which is configured to read sensed voltages corresponding to one or both of the nodes $V_{RECT}$, $V_{BULK}$. A minimum voltage, denoted $V_{MIN}$, that is required to adequately power the primary-side winding 122 is stored within a memory of the controller 240. The voltage node selector 242 monitors the measured voltage at the first rectified voltage node $V_{RECT}$ and compares it against the minimum voltage $V_{MIN}$. When this measured voltage at $V_{RECT}$ is above the minimum voltage $V_{MIN}$, the voltage node selector 242 selects the first rectified voltage node $V_{RECT}$ for powering the transformer 120. In a first sub-embodiment, when the voltage node selector 242 detects that the voltage at the first rectified voltage node $V_{RECT}$ has decreased to the minimum voltage $V_{MIN}$, the voltage node selector 242 instead selects the second rectified voltage node $V_{BULK}$, which is tied to the bulk capacitor $C_{BULK}$, for powering the transformer 120.

The voltage node selector 242 selects the first rectified voltage node $V_{RECT}$ by enabling the first switch control signal generator 246a. The first switch control generator 246a, in turn, generates a first PWM signal $V_{PWM\_S1}$ based upon an output of the PID controller 244, e.g., a duty cycle. The first PWM signal $V_{PWM\_S1}$ switches the first power switch $S_1$, via the first driver 152a, so as to generate an AC voltage across the primary-side winding 122. Power is effectively routed from the first rectified voltage node $V_{RECT}$ to the transformer 120. During this time interval, the second switch control signal generator 246b may be disabled, so that the second power switch $S_2$ is left open and no power is transferred from the voltage node $V_{BULK}$ of the bulk capacitor $C_{BULK}$.

Conversely, the voltage node selector 242 selects the second rectified voltage node $V_{BULK}$, which may draw energy from the storage provided by the bulk capacitor $C_{BULK}$, by enabling the second switch control signal generator 246b. The second switch control signal generator 246b generates a second PWM signal $V_{PWM\_S2}$ in the same manner as described above, except that the voltage node $V_{BULK}$ provides power to the primary-side winding 122 of the transformer 120.

Regardless of which power switch $S_1$, $S_2$ is used and which voltage node $V_{RECT}$, $V_{BULK}$ supplies power to the primary side of the transformer 120, the power transferred to the secondary-side winding 124 and the load 130 is similar.

The controllers 140, 240 and their constituent parts may be implemented using a combination of analog hardware components (such as transistors, amplifiers, diodes, and resistors), and processor circuitry that includes primarily digital components. The processor circuitry may include one or more of a digital signal processor (DSP), a general-purpose processor, and an application-specific integrated circuit (ASIC). The controllers 140, 240 may also include memory, e.g., non-volatile memory such as flash, that includes instructions or data for use by the processor circuitry, and one or more timers. Such memory may store values for the minimum voltage $V_{MIN}$ and the reference voltage $V_{REF}$. The controllers 140, 240 input sensor signals such as signals corresponding to the output voltage $V_{OUT}$, the voltage at the first rectified voltage node $V_{RECT}$, and the voltage at the second rectified voltage node $V_{BULK}$, and generates signals $V_{PWM\_S1}$, $V_{PWM\_S2}$ for controlling the switches $S_1$, $S_2$ within the power converter 100.

Figure 3A:
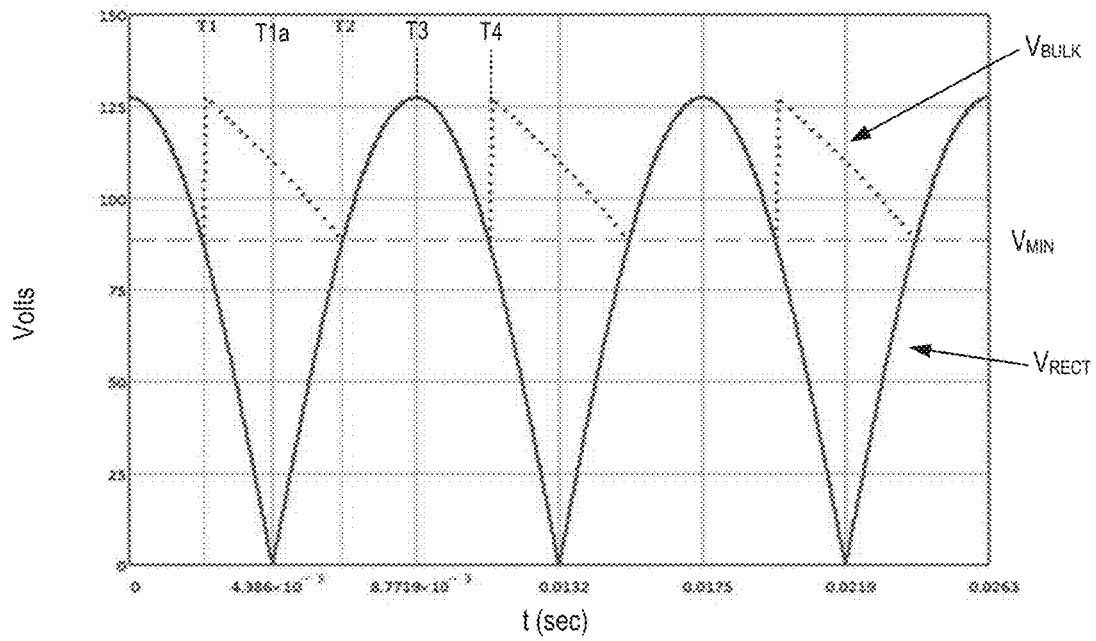
FIG. 3A illustrates voltage waveforms corresponding to two different nodes such as those included in the power converter of FIG. 1.

FIG. 3A illustrates waveforms corresponding to voltages within the power converter 100. An AC source voltage (not shown) supplies a sinusoidal voltage with a frequency of 57 Hz to the bridge rectifier 110, which outputs a rectified voltage, illustrated as $V_{RECT}$, having a peak amplitude of approximately 125 V. A minimum voltage, shown as $V_{MIN}$=86V, is required for proper operation of the power converter 100.

For the interval from time t=0 sec until time T1, the controller 140 selects the first rectified voltage node $V_{RECT}$ to power the primary-side winding 122. At time T1, the controller 140 detects that a measured voltage at the first rectified voltage node $V_{RECT}$ has decreased to the minimum voltage $V_{MIN}$. The controller 140 then selects the second rectified voltage node $V_{BULK}$, which is coupled to the bulk capacitor $C_{BULK}$, for powering the primary-side winding 122. Prior to this altered selection, the bulk capacitor $C_{BULK}$ was charged, via the diode $D_1$, to a voltage level of approximately 125V, i.e., the peak voltage at the first rectified voltage node $V_{RECT}$. At time t=T1, the voltage at the second rectified voltage node $V_{BULK}$ is switchably applied across the primary-side winding 122, and begins with an approximate value of $V_{BULK}$=125V. As energy is depleted from the bulk capacitor $C_{BULK}$ after time T1, the voltage $V_{BULK}$ decreases. For a properly-sized bulk capacitor $C_{BULK}$, the voltage $V_{BULK}$ should not drop below the minimum voltage $V_{MIN}$. At time t=T2, the controller 140 detects that the measured voltage at the first rectified voltage node $V_{RECT}$ has risen above the minimum voltage $V_{MIN}$, and again selects the first rectified voltage node $V_{RECT}$ to power the first primary-side winding 122a. This selection is maintained until time t=T4, when the bulk capacitor $C_{BULK}$ and its voltage node $V_{BULK}$ are next selected to power the primary-side winding 122. Between the times t=T2 and T3, the bulk capacitor $C_{BULK}$ is charged from the first rectified voltage node $V_{RECT}$ via the diode $D_1$.

In summary, the controller 140 selects the first rectified voltage node $V_{RECT}$ to power the transformer 120 between times t=0 and T1, when the voltage at $V_{RECT}$>$V_{MIN}$. Between times T1 and T2, when the voltage at $V_{RECT}$<$V_{MIN}$, the bulk capacitor $C_{BULK}$ and its voltage node $V_{BULK}$ are used to power the transformer 120. Note that the comparison with the minimum voltage $V_{MIN}$ may also make use of some hysteresis, e.g., the selection of the voltage node $V_{RECT}$ at time T2 may not occur until the rectified voltage reaches a value $V_{MIN}$+$V_{HYST}$.

If the power converter 100 is rated to output 25 W to the load 130, and for a rectified input voltage peak of 125V, a bulk capacitance of approximately 26 µF is required to ensure that the voltage used to power the transformer 120 does not fall below the minimum voltage of 86V. Presuming a capacitor tolerance rating of 20%, a standard-sized bulk capacitor $C_{BULK}$=33 µF would need to be used in such a power converter.

Figure 3B:
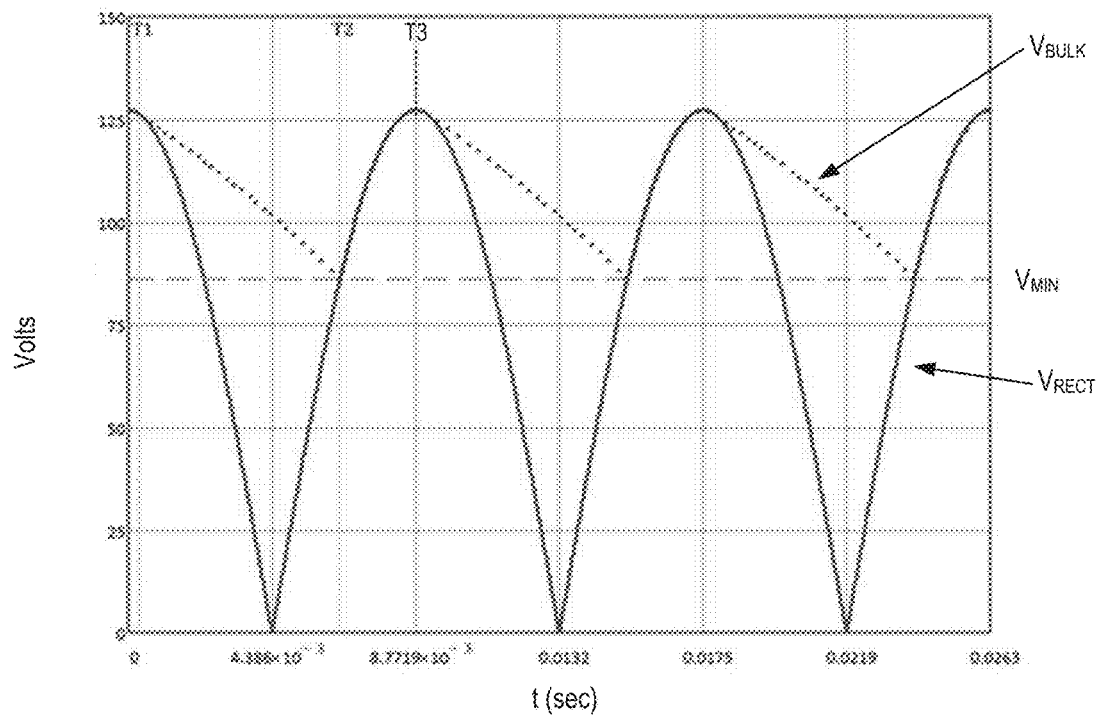
FIG. 3B illustrates voltage waveforms corresponding to nodes within a power converter in which power is supplied to a primary-side winding only from a bulk capacitor.

FIG. 3B illustrates voltage waveforms within a power converter that does not select between separate rectified voltage nodes $V_{RECT}$, $V_{BULK}$ for powering a transformer, but instead always powers a transformer from a voltage node, such as $V_{BULK}$ of the power converter 100, that is tied to a bulk capacitor. For such a power converter, the bulk capacitor must power the transformer for the entire timespan from T1 to T2. (During the period between T2 and T3, a bridge rectifier provides power both to the transformer and to the bulk capacitor for charging.) Because the timespan for discharging the bulk capacitor is longer than the corresponding timespan illustrated in FIG. 3A, a larger bulk capacitor having higher energy-storage capabilities is required. More particularly, a rated bulk capacitor $C_{BULK}=47$ µF would be needed to meet the same requirements described above in relation to FIG. 3A and power converter 100.

The waveforms of FIGS. 3A and 3B and the above description show that the power converter 100 is able to meet the same minimum voltage requirements for a DC/DC voltage converter with approximately a 33% reduction in the capacitance of the bulk capacitor. Whereas a conventional power converter rated for 25 W output power may require a bulk capacitor $C_{BULK}=47$ µF, the power converter 100 described above would only require a bulk capacitor of $C_{BULK}=33$ µF. More generally, conventional power converters require 1.5 to 2.0 µF of bulk capacitance for each rated Watt of output power. The circuits and techniques described herein allow the bulk capacitance to be reduced to less than 1.4 µF for each rated Watt of output power and, typically, the capacitance can be in the range of 1.0 to 1.4 µF for each rated Watt of output power.

Alternative Switch Selection Techniques

The techniques described in conjunction with FIG. 3A select only one of the switches $S_1$, $S_2$ for supplying power and presume a constant voltage threshold (e.g. $V_M U+V_{HYST}$) for converting to using the second switch $S_2$ as the rectified voltage $V_{RECT}$ increases, e.g., at time t=T2 in FIG. 3A. An improved controller may sometimes use both of the switches $S_1$, $S_2$, and/or may use a comparison between the rectified voltages $V_{RECT}$, $V_{BULK}$ rather than a comparison against a fixed threshold. Such improved techniques will be described below using the interval between times t=0 and T3 within FIG. 3A as a reference.

During the interval between time t=0 and T1, the controller operates much as described above, except that the controller will detect that the first rectified voltage $V_{RECT}$ is decreasing. This voltage decrease may be determined by sampling the measured voltage $V_{RECT}$ and detecting that its slope is negative. In addition to detecting that the measured voltage $V_{RECT}$ is decreasing, the controller also compares this voltage $V_{RECT}$ against the minimum voltage $V_{MIN}$. Once the controller detects that the decreasing voltage has dropped below the minimum voltage $V_{MIN}$, the controller converts from using the first power switch $S_1$ to using the second power switch $S_2$, thereby converting from supplying power from the first rectified voltage node to supplying power from the bulk capacitor $C_{BULK}$.

The techniques described previously compared the voltage of the first rectified voltage $V_{RECT}$ against the minimum voltage $V_{MIN}$ (with, optionally, an additional hysteresis term $V_{HYST}$) during the interval between times t=T1 and T2. If the bulk capacitor $C_{BULK}$ is undersized and/or the load 130 is drawing an excessive amount of power, the storage voltage $V_{BULK}$ may fall below the minimum voltage $V_{MIN}$ before time t=T2. In some cases, the first rectified voltage $V_{RECT}$ may have a higher voltage than the storage voltage $V_{BULK}$ and, hence, be preferred for powering the primary-side winding 122. Conversely, e.g., under light load, the storage voltage $V_{BULK}$ may not decrease below the minimum voltage $V_{MIN}$ until a point in time well after time t=T2. By using a comparison against the (fixed) minimum voltage $V_{MIN}$, the controller may use the second rectified voltage $V_{BULK}$, and its bulk capacitor $C_{BULK}$, more often than is necessary or preferred.

An improved technique compares the first rectified voltage $V_{RECT}$ against the second rectified voltage $V_{BULK}$ after time t=T1. Whichever voltage node provides the higher voltage is selected for providing power to the primary-side winding 120, at least until time t=T3. Typically, the time interval from time t=T1 until at least a point in time after t=T1a will use the second rectified voltage $V_{BULK}$ by selecting the second switch $S_2$ for switching. At some point between times t=T1a and t=−T3, the first rectified voltage $V_{RECT}$ will rise above the second rectified voltage node $V_{BULK}$. At this point in time, the controller will convert from using the second switch S2 to instead use the first switch $S_1$, which supplies power from the first rectified voltage node $V_{RECT}$.

In another subembodiment, once it is detected that the first rectified voltage node $V_{RECT}$ should power the primary-side winding 122 and that this voltage $V_{RECT}$ is increasing, the controller uses both switches $S_1$, $S_2$ for supplying power. Such a time interval may correspond, e.g., to times t=−T2 to t=T3 in FIG. 3A. In this subembodiment, current flows to the primary-side winding 122 directly from the first rectified voltage $V_{RECT}$ and the first switch $S_1$, and also flows to the primary-side winding 120 through diode $D_1$ and the second switch $S_2$. Such simultaneous switching is advantageously performed until it is detected that the first rectified voltage $V_{RECT}$ is no longer increasing, e.g., at time t=T3 in FIG. 3A. By using both switches in parallel, the conductivity losses may be reduced during this time interval.

Alternative Power Converter Topologies

Figure 4:
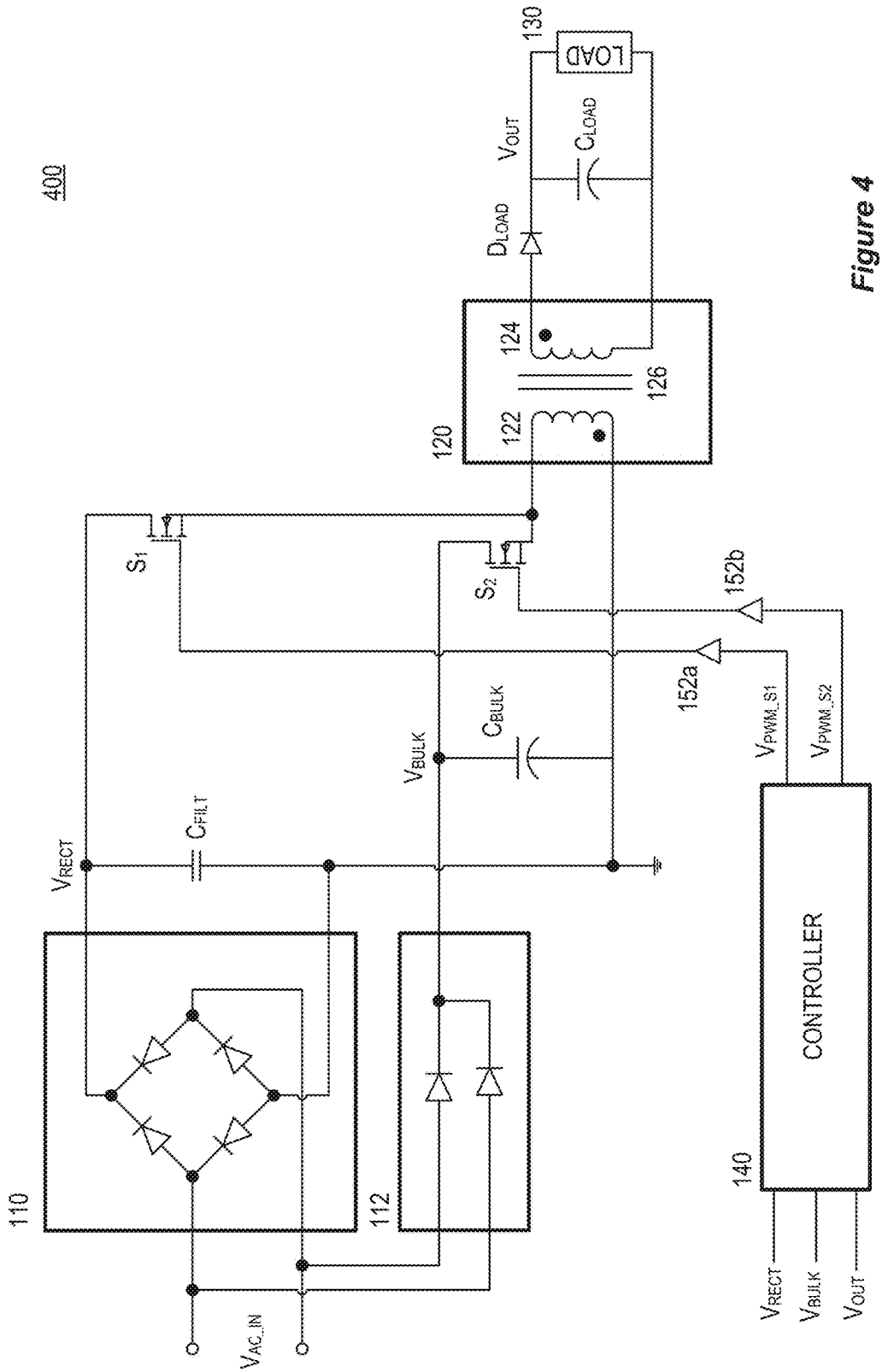
FIG. 4 illustrates an alternative power converter that includes a second rectifier and a filter capacitor.

FIG. 4 illustrates a power converter 400 that is similar to that of FIG. 1. Only those aspects and components that differ from FIG. 1 will be described below. The primary difference for the power converter 400 is that the diode $D_1$ illustrated in FIG. 1 is replaced with a second rectifier 112, which includes two diodes. This configuration offers the advantage that one diode drop is eliminated, thereby improving efficiency. A disadvantage of the power converter 400 is that it requires an additional diode relative to the power converter 100 of FIG. 1.

Another difference is that a filter capacitor $C_{FILT}$ is coupled across the rectified voltage node $V_{RECT}$ and ground. The filter capacitor $C_{FILT}$ is used to filter high-frequency noise from the first rectified voltage node $V_{RECT}$. Note that the filter capacitor $C_{FILT}$ serves an entirely different purpose than the bulk capacitor $C_{BULK}$, which stores substantial amounts of energy, and that the capacitance of the capacitor $C_{FILT}$ is significantly smaller than that of the bulk capacitor $C_{BULK}$, e.g., by several orders of magnitude. Whereas the bulk capacitor $C_{BULK}$, stores energy from an AC source with a fairly low frequency, e.g., 50 Hz or 60 Hz, the filter capacitor $C_{FILT}$ removes unwanted noise caused by the fast switching, which is typically 100 KHz or higher, of the power switches $S_1$, $S_2$. The filter capacitor $C_{FILT}$ typically has a capacitance of 100 nF or less, and is not a significant portion of the power converter size. A similar filter capacitor may be desired in the other power converter circuits described herein.

Power Converter with Switching on Ground Side of Transformer

Figure 5:
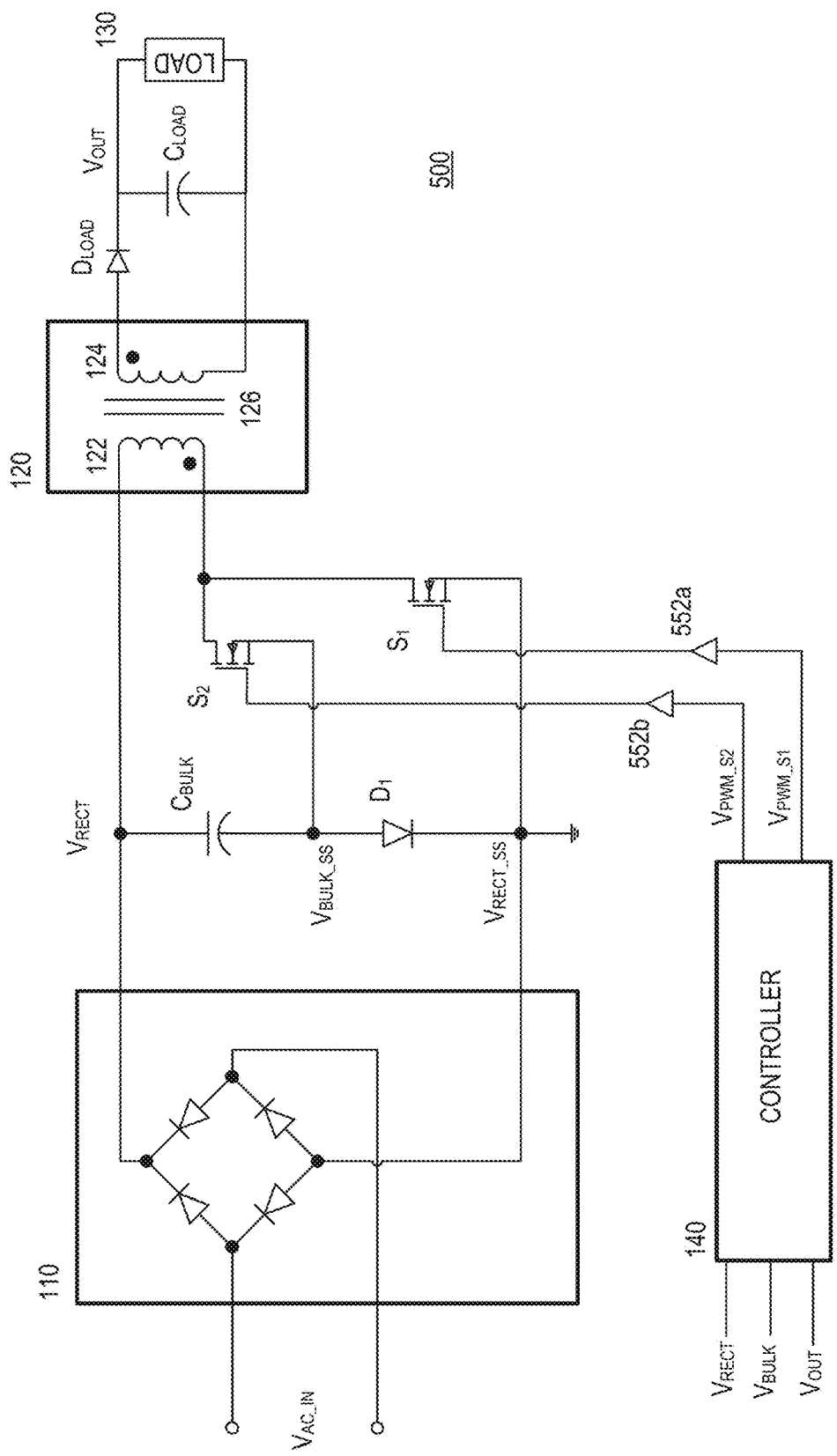
FIG. 5 illustrates another alternative power converter in which power to the primary-side winding is switched on the ground side of the winding.
Figure 6:
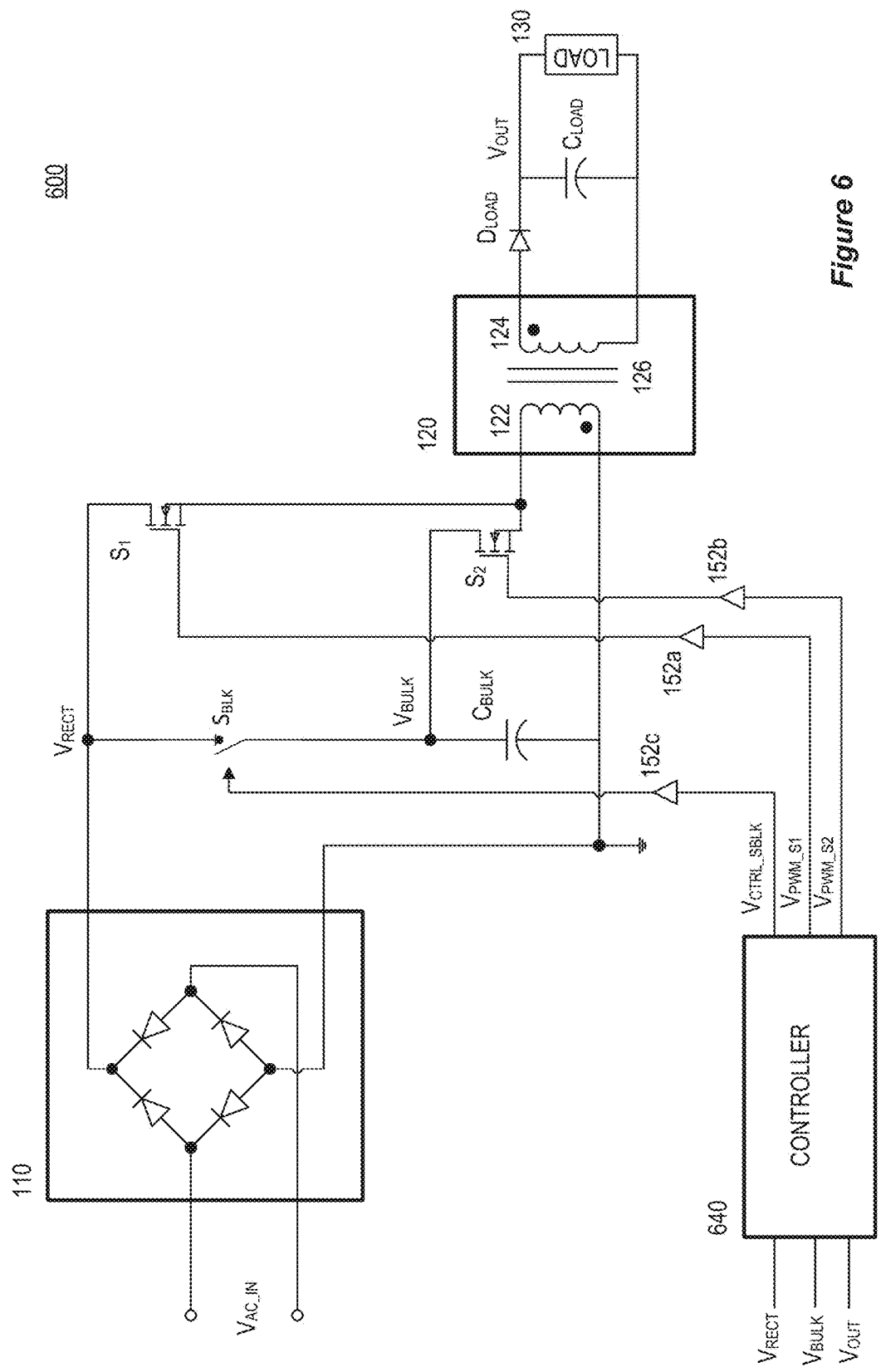
FIG. 6 illustrates a power converter in which power is supplied to a bulk capacitor using a bi-directional switch.

FIG. 5 illustrates a power converter 500 that differs from that of FIG. 1 primarily in that power is switched on the ground side of the transformer 120, and the power selection is made between two voltage nodes on the negative side of the primary-side winding 122. The first power switch $S_1$ couples power to the primary-side winding 122 from the first rectified voltage node $V_{RECT}$ by switching the connection to a ground node $V_{RECT\_SS}$ that is coupled to the negative side of the rectifier 110. A bulk capacitor $C_{BULK}$ is connected between the first rectified voltage node $V_{RECT}$ and a diode $D_1$ at a voltage node $V_{BULK\_SS}$, with the diode $D_1$ further being connected to the ground node $V_{RECT\_SS}$. The second power switch $S_2$ couples power to the primary-side winding 122 from the first rectified voltage node $V_{RECT}$ by switching the connection to the second ground node $V_{BULK\_SS}$, which is tied to the bulk capacitor $C_{BULK}$. Such a configuration has the advantage that the switch drivers 552a, 552b are ground-referenced and may be driven by a low-voltage control signal. However, this configuration has the disadvantage that the "dotted" terminal of the primary-side winding 122 is floating when the power switches $S_1$, $S_2$ are open, meaning that the transformer 120 will be more susceptible to noise, i.e., the output from the secondary winding 124 may be noisier than a configuration in which the primary-side winding 122 is always grounded. Power Converter Using Bi-Directional Switch to Limit Voltage at Bulk Capacitor FIG. 6 illustrates a power converter 600 in which the diode $D_1$ of FIG. 1 has been replaced with a current-blocking device $S_{BLK}$. Whereas the diode $D_1$ is only capable of blocking current flow in one direction, the current-blocking device $S_{BLK}$ is preferably able to block current flow in either direction through it. The current-blocking device $S_{BLK}$ may be a bi-directional switch as may be constructed, e.g., using two back-to-back MOSFETs or similar. A configuration using such a bi-directional switch provides several potential advantages as compared to the power converters 100, 400 of FIGS. 1 and 4 which uses diodes, which are passive uni-directional current-blocking devices.

Bi-directional switches, such as the current-blocking device $S_{BLK}$, may replace the diodes within the second rectification circuit 112 of FIG. 4, the diode $D_1$ in FIG. 5, or similar diodes in other power converter topologies that use the techniques herein. Unlike a diode, use of the bi-directional switch $S_{BLK}$ requires a control signal $V_{CTRL}S_{BLK}$ that determines when the switch $S_{BLK}$ should conduct. In order to mimic the diode $D_1$, the controller 640 generates the control signal $V_{CTRL\_SBLK}$ such that the bi-directional switch $S_{BLK}$ conducts only when the first rectified voltage $V_{RECT}$ is greater than the second rectified voltage $V_{BULK}$. The control signal $V_{CTRL\_SBLK}$ generated by the controller 640 is provided to a control terminal, e.g. a gate or gates, of the bi-directional switch $S_{BLK}$ via the driver 152c. Many of the advantages provided by the bi-directional switch $S_{BLK}$ rely upon control techniques that are more complex than merely mimicking diode operation, and are described further below.

The switch $S_{BLK}$, whether it is bi-directional or not, typically has lower conduction losses than a diode, leading to improved efficiency of the power converter 600 as compared to the power converters using a diode in this capacity. The switch $S_{BLK}$ may be pulsed as the rectified voltage $V_{RECT}$ rises, so as to limit inrush current at least as provided via the second switch $S_2$. Yet another advantage is that a bi-directional switch $S_{BLK}$ may limit the maximum voltage seen by the bulk capacitor $C_{BULK}$ and the second switch $S_2$. By appropriately limiting this maximum voltage, the voltage rating of the bulk capacitor $C_{BULK}$ may be decreased, which typically leads to a desirable reduction in the size of the bulk capacitor $C_{BULK}$.

Use of the bi-directional switch $S_{BLK}$ for reducing the maximum required voltage rating of the bulk capacitor $C_{BULK}$ is particularly advantageous for the previously-described universal power converters. Such power converters are typically required to handle peak line voltages of approximately 340V, so as to support the 240 $V_{RMS}$ mains AC voltage used in much of the world. When providing some margin for lightening surges or other anomalies, the bulk capacitor typically must be sized for approximately 400V. Because the capacitance of the bulk capacitor $C_{BULK}$ is typically determined from requirements for a lower-voltage mains voltage, e.g., the 125V peak voltage illustrated in FIGS. 3A and 3B, the high voltage levels provided by a 240 $V_{RMS}$ mains AC voltage are not really necessary for driving the transformer 120. The controller 640 may control the bi-directional switch $S_{BLK}$ so as to limit the maximum voltage provided to the bulk capacitor $C_{BULK}$, while still meeting the power requirements of the power converter 600.

Figure 7:
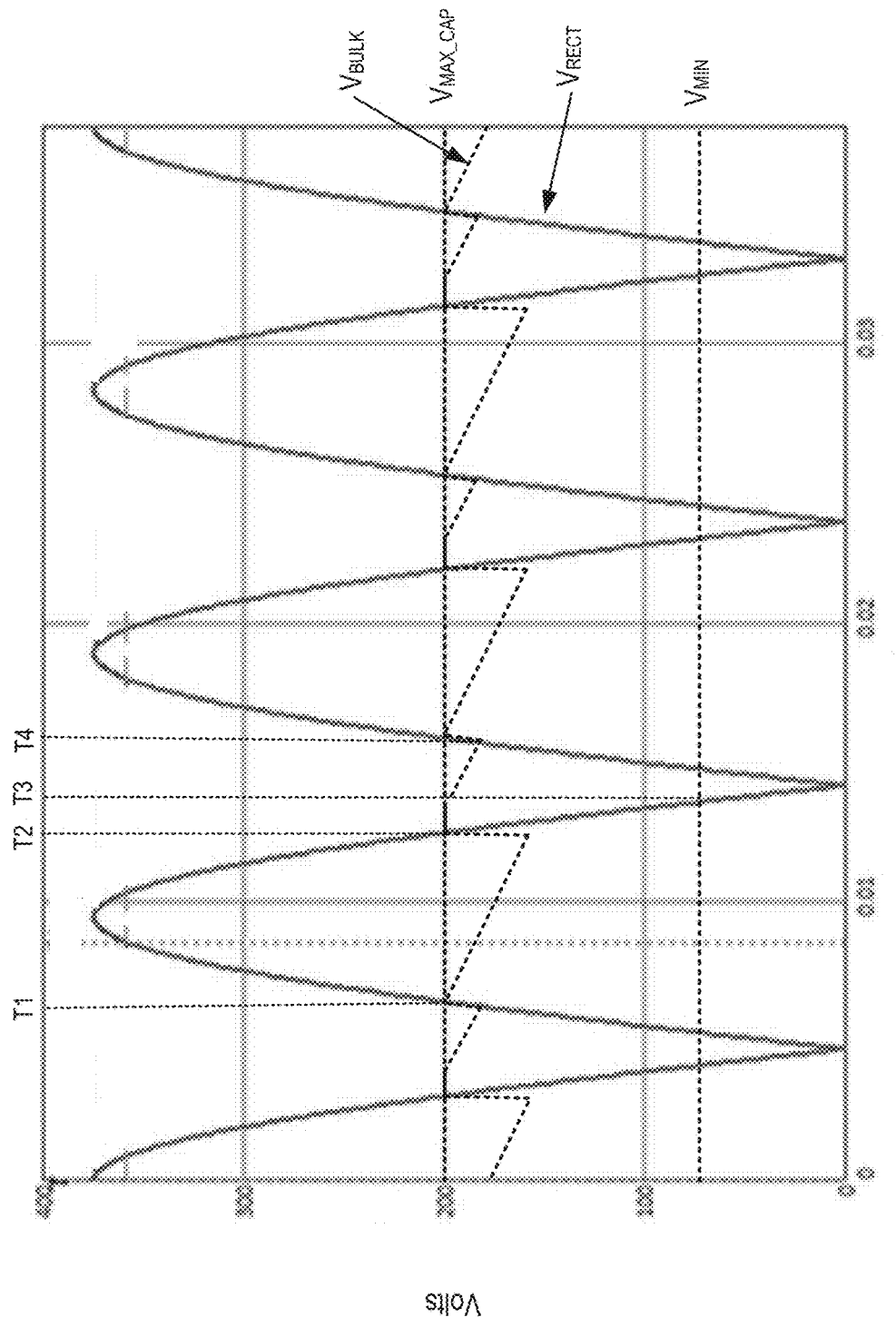
FIG. 7 illustrates voltage waveforms corresponding to nodes such as the nodes included in the power converter of FIG. 6.

FIG. 7 illustrates waveforms corresponding to the first rectified voltage node $V_{RECT}$ and the second rectified voltage node $V_{BULK}$ within the power converter 600 of FIG. 6. For the illustrated scenario, the power converter is supplied by a high-voltage AC mains supply, wherein the rectifier 110 provides a peak voltage of approximately 375V. The transformer 120 requires a minimum voltage input $V_{MIN}$ of 86V, as in the scenarios illustrated in FIGS. 3A and 3B. The bulk capacitor $C_{BULK}$ has a maximum voltage rating $V_{MAX\_CAP}$ of 200V. As explained below, the controller 640 must control the bi-directional switch $S_{BLK}$ so as to ensure this maximum voltage rating is not violated.

At time t=T1, the bulk capacitor $C_{BULK}$ has been charged to a level of $V_{BULK}$=200V. Responsive to detecting that the storage voltage $V_{BULK}$ (or, similarly, the first rectified voltage $V_{RECT}$) has reached a maximum voltage threshold $V_{MAX\_CAP}$, i.e., 200V for this example, the controller 640 disables the bi-directional switch $S_{BLK}$ at time t=T1, thereby preventing the storage voltage $V_{BULK}$ from rising above the maximum voltage threshold $V_{MAX\_CAP}$. Between times t=T1 and T2, the controller 640 switches the second switch $S_2$ so as to supply power to the transformer 120 from the bulk capacitor $C_{BULK}$. At time t=T2, the controller 640 detects that the first rectified voltage $V_{RECT}$ has fallen below the maximum voltage threshold $V_{MAX\_CAP}$ (e.g., 200V). Responsive to this detection, the controller 640 enables the bi-directional switch $S_{BLK}$ at time t=T2 such that the switch $S_{BLK}$ begins conducting again and the bulk capacitor $C_{BULK}$ is charged. Shortly after time t=T2, e.g., when it is detected that the sensed storage voltage $V_{BULK}$ has risen to, or nearly to, the level of the sensed first rectified voltage $V_{RECT}$, the controller 640 disables the bi-directional switch $S_{BLK}$ so as to maintain the charged voltage (e.g., slightly under 200V) on the bulk capacitor $C_{BULK}$. Between this point in time and time t=T3, the first rectified voltage $V_{RECT}$ is used to power the transformer 120 by switching the first switch $S_1$. In an alternative embodiment, the controller may alternate use of the first and second switches $S_1$, $S_2$, so as to maintain a smoother average voltage input to the transformer 120.

At time t=T3, the controller 640 detects that the first rectified voltage $V_{RECT}$ has fallen to the minimum voltage threshold $V_{MIN}$. As similarly described regarding FIG. 3A, the controller 640 then disables the first switch $S_1$, and begins switching the second switch S2 to supply power to the transformer 120 from the bulk capacitor $C_{BULK}$. Between times t=T3 and t=T4, the storage voltage $V_{BULK}$ drops as energy from the bulk capacitor $C_{BULK}$ is depleted. At time t=T4, the controller 640 detects that the first rectified voltage $V_{RECT}$ has risen above the storage voltage $V_{BULK}$. Responsive to this detection, the controller 640 enables the bi-directional switch $S_{BLK}$ such that it conducts and the bulk capacitor $C_{BULK}$ is charged. This state is maintained until the sensed storage voltage $V_{BULK}$ rises to the maximum voltage threshold $V_{MAX\_CAP}$, at which point the bi-directional switch $S_{BLK}$ is disabled such that it does not conduct. During this interval just after time t=T4, the first switch $S_1$ may be switched or both switches $S_1$, $S_2$ may be switched, as described above in the "Alternative Switch Selection Techniques" section, to provide power to the primary-side winding 120. The above-described sequence of events starting at time t=T1 then repeats for each half-sinusoid of the rectified voltage $V_{RECT}$.

For a scenario in which the peak value of the first rectified voltage $V_{RECT}$ remains below the maximum voltage threshold $V_{MAX\_CAP}$, the bi-directional switch $S_{BLK}$ may operate to merely mimic a diode. The resultant voltage waveforms would be very similar to the waveforms illustrated in FIG. 3A.

Power Converter Operation During Low-Power Modes

Use of the bi-directional switch $S_{BLK}$ provides additional advantages for a power converter operating in a low-power (e.g., burst) mode of operation. The controller 640 may detect, e.g., from the load voltage $V_{OUT}$ or from sensing a current provided to the load 130, that the load 130 is operating in a state in which a very low level of power is needed. For example, the load 130 may be in a standby operational mode. During low-power operation of the power converter 600, it may be possible to provide energy packets to the transformer 120, e.g., by providing a pulse to the first switch $S_1$ or the second switch S2, at a rate that is lower than the frequency of the input power source (e.g., 50 Hz, 60 Hz). Preferably, during such light-load conditions, the power converter 600 may leave $S_1$ disabled and only use the second switch S2, and the energy stored on the bulk capacitor $C_{BULK}$, for several cycles of the input source voltage.

Under light-load conditions and using the techniques described above, the controller 640 (e.g., particularly a PID controller therein) may generate very short pulses to control the second switch $S_2$ using the control signal $V_{PWM\_S2}$. The pulses may be so short as to violate minimum on-times for the second switch $S_2$. (For example, MOSFETs often have a minimum on-time duration.) Furthermore, the short switch pulses and resultant switching frequency may generate undesirable audible noise. These problems may be addressed by supplying a lower voltage level to the primary winding 120 during low-power mode as compared to a normal operational mode of the power converter 600. By providing energy pulses having a lower voltage, the time interval of the required pulses will be longer, thereby meeting any minimum on-time for the second power switch S2 and leading to a switching frequency that is outside the audible range (e.g., outside approximately 20 Hz to 20 kHz).

As explained in FIG. 7 and its description, the bi-directional switch $S_{BLK}$ is used to limit the voltage provided to the second rectified voltage node $V_{BULK}$ to a range between $V_{MIN}$ (e.g., 86V) and the maximum voltage threshold $V_{MAX\_CAP}$ (e.g., 200V). The minimum voltage $V_{MIN}$ described previously represents a minimum voltage required by the DC/DC power converter during normal operational mode in order to meet the power requirements of the load 130. During the low-power mode of operation, this minimum voltage does not apply.

During low-power operation, the controller 640 may control the bi-directional switch $S_{BLK}$ in much the same manner as described in conjunction with FIG. 7, except that different minimum and maximum voltage thresholds are defined for low-power operation. FIG. 7 shows that the voltage provided to the primary winding 122 is within the range of $V_{MIN}$=86V to the maximum voltage threshold $V_{MAX\_CAP}$=200V. In a preferred sub-embodiment, the controller 640, during low-power operation, controls the bi-directional switch $S_{BLK}$ so as to maintain a voltage at the second rectified voltage node $V_{BULK}$ that is within a range that is lower in magnitude than the normal operational mode, e.g., this voltage may be kept within a range of 20V to 25V rather than 86V to 200V. This is accomplished by only enabling the bi-directional switch $S_{BLK}$ when the controller 640 detects that the voltage at the first rectified voltage node $V_{RECT}$ is within the range 20 to 25V. With the storage voltage $V_{BULK}$ within this range, the controller 640 may use the second switch $S_2$ to provide power to the primary-side winding 122 from the bulk capacitor $C_{BULK}$ during low-power operational mode.

Power Converters with Multiple Sets of Bulk Capacitors and Switches

Figure 8:
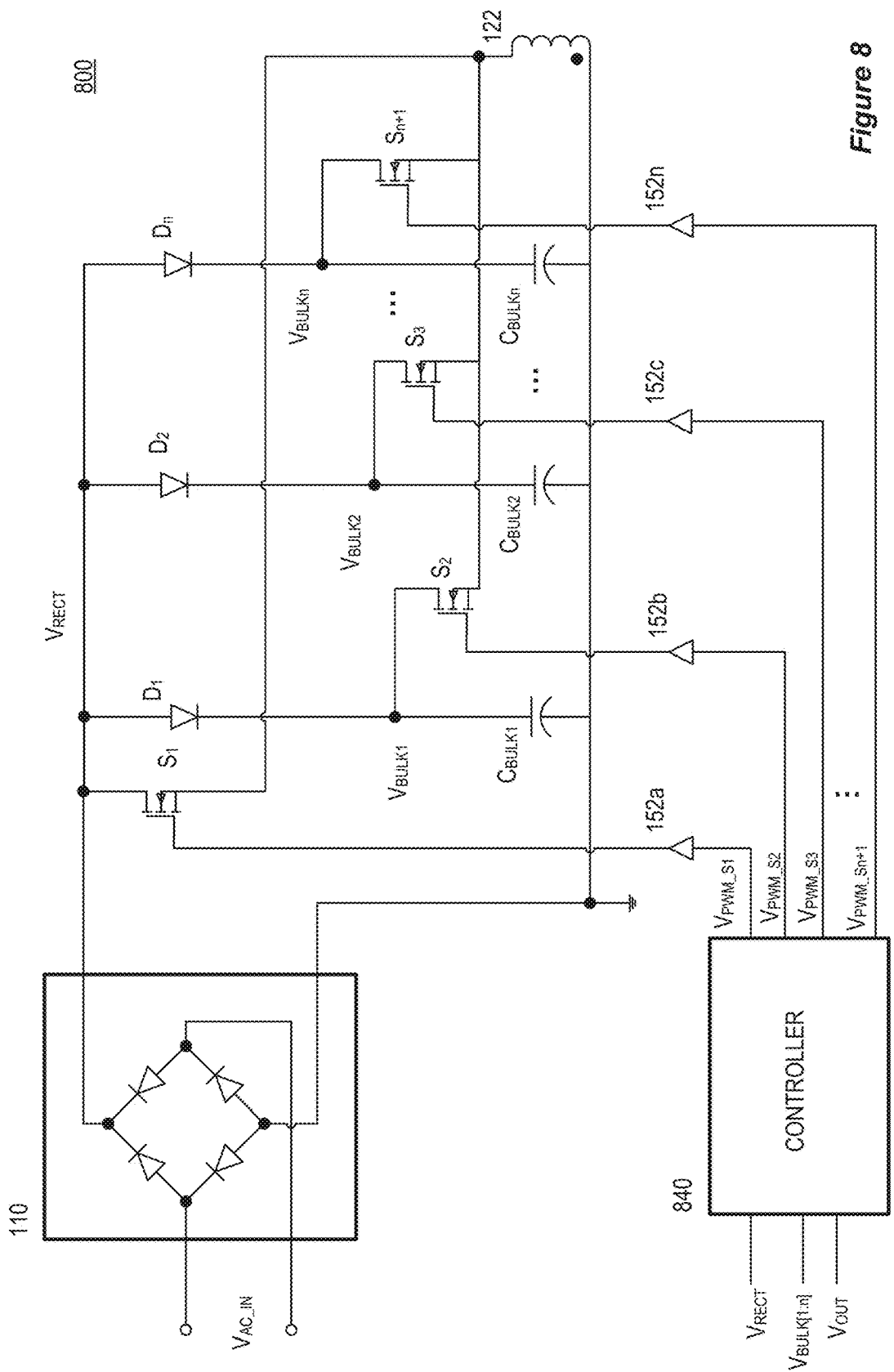
FIG. 8 illustrates a power converter that includes a plurality of bulk capacitors, together with associated diodes and switches.

FIG. 8 illustrates a power converter 800 that is a variation of the power converter 100 of FIG. 1. For ease of illustration, only the primary-side winding 122 of the transformer is shown, with the understanding that the rest of the transformer and the components on the secondary side of the transformer would be similar to the circuits described previously. Rather than having one circuit block comprising a diode $D_1$, a bulk capacitor $C_{BULK}$, and a power switch $S_2$, the illustrated power converter 800 includes multiple such circuit blocks. More particularly, a second circuit block comprising a second diode $D_2$, a second bulk capacitor $C_{BULK2}$, and a third power switch $S_3$ are shown. Such circuit blocks may be repeated up to an $n^{th}$ circuit block comprising a diode $D_n$, a bulk capacitor $C_{BULKn}$, and a power switch $S_{n+1}$. Each power switch $S_2$, $S_3$, ... $S_{n+1}$ has an associated driver 152b, 152c ... 152n that is driven by a control signal $V_{PWM\_S2}$, $V_{PWM\_S3}$, ... $V_{PWM\_Sn+1}$.

The controller 840 inputs voltages corresponding to multiple second rectified voltage nodes $V_{BULK1}$, $V_{BULK2}$, ... $V_{BULKn}$. The controller 840 operates in a similar manner as described in conjunction with FIG. 3A, except that the selection of a switch and bulk capacitor sequences through each of the circuit blocks during the interval when the first rectified voltage node $V_{RECT}$ is below the minimum voltage threshold $V_{MIN}$. This will be explained with reference to FIG. 3A, though not all of the described waveforms are illustrated in this figure. For operation that is not explicitly described, the operation described in conjunction with FIG. 3A may be presumed.

From time t=0 to t=T1, the controller 840 switches the first switch $S_1$ so as to provide power to the primary-side winding 122 from the first rectified voltage node $V_{RECT}$. At time t=T1, the controller 840 detects that the voltage of the first rectified voltage node $V_{RECT}$ has dropped below the minimum allowed voltage $V_{MIN}$. In response to this detection, the controller 840 selects the second switch $S_2$ for switching, such that power is provided from the first bulk capacitor $C_{BULK1}$. (The first switch $S_1$ is turned off so that it does not conduct.) Subsequent to this, the voltage $V_{BULK1}$ of the first bulk capacitor $C_{BULK}$ is depleted to the minimum allowed voltage $V_{MIN}$. Upon detecting this, the controller 840 turns off the second switch $S_2$ and begins switching the third switch $S_3$, such that power is provided from the second bulk capacitor $C_{BULK2}$ rather than the first rectified voltage node $V_{RECT}$ or the first bulk capacitor $C_{BULK1}$. Such operation is repeated until the $(n+1)^{st}$ power switch $S_{n+1}$ is used to supply power from the $n^{th}$ bulk capacitor $C_{BULKn}$. Under less than full-load conditions, some of the bulk capacitors may go unused during an input switch cycle.

The use of the bulk capacitors capacitor $C_{BULK1}$ ... $C_{BULKn}$ ceases at time t=T2, when the controller 840 detects that the first rectified voltage $V_{RECT}$ has risen above the minimum allowed voltage $V_{MIN}$. As in the operation described in conjunction with FIG. 3A, between times t=T2 and t=T4 the controller 840 switches the first switch $S_1$ so as to provide power to the primary-side winding 122 from the rectified voltage node $V_{RECT}$. From time t=T2 to t=T3, the first through $n^{th}$ diodes $D_1, D_2, \ldots D_n$ charge each of the bulk capacitors $C_{BULK1}, C_{BULK2}, \ldots C_{BULKn}$.

Method for Controlling Power Converter with Separate Rectified Voltage Nodes

Figure 9:
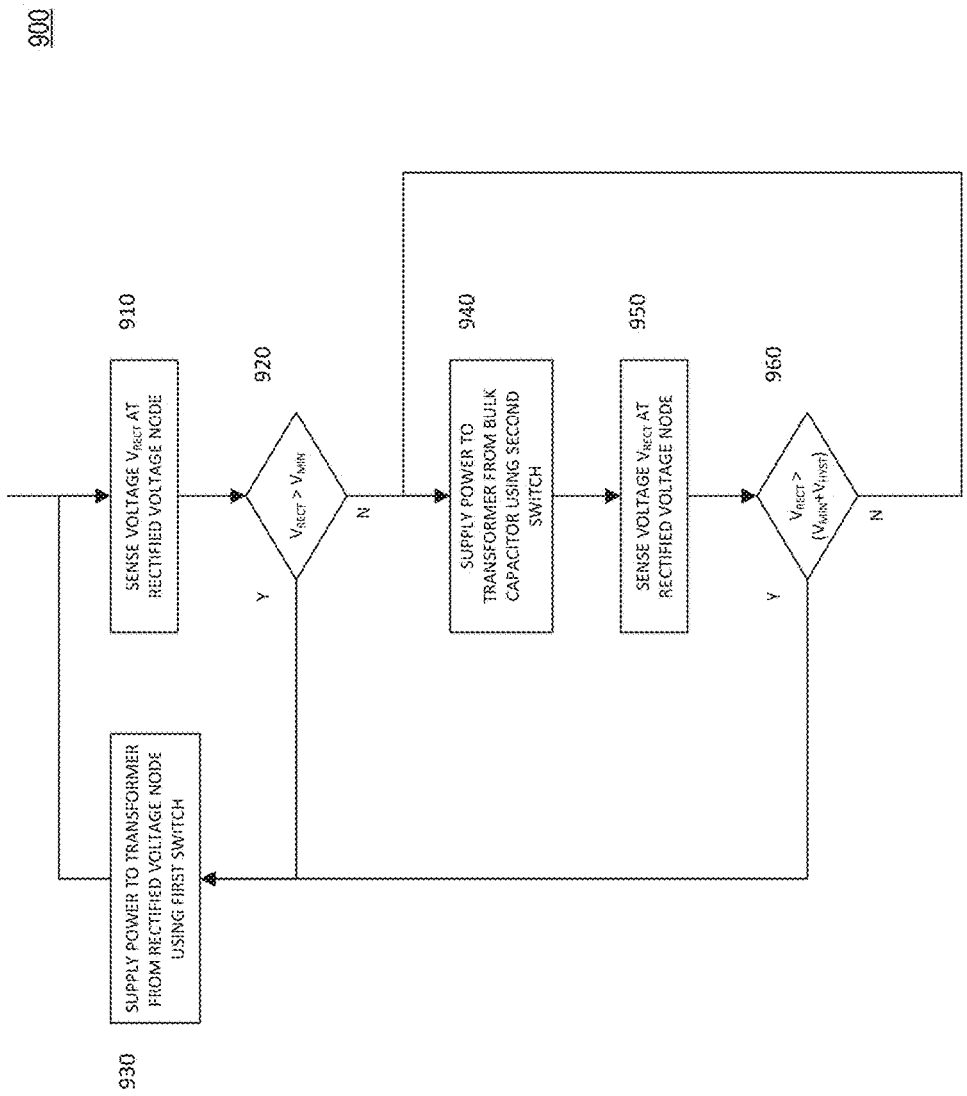
FIG. 9 illustrates a method, within a power converter, for switching power switches so as to supply power to primary-side winding(s) of a transformer from two different voltage nodes.

FIG. 9 illustrates a method 900 for supplying power to a primary-side winding of a power converter, such as the power converter 100 of FIG. 1. This method may be implemented, e.g., within a controller of the power converter, such as the controller 140 of FIG. 1. The techniques of this method 900 are similar to the techniques described above for the power converter 100 of FIG. 1, and may be implemented within such a power converter. While not described below, it should be recognized that the method 900 may be readily modified to implement the techniques described in conjunction with FIGS. 4-6 and 8.

In a first step 910, a voltage $V_{RECT}$ at a first rectified voltage node is sensed (measured). This may be done using an analog-to-digital converter (ADC) within a controller, as is known in the art. The sensed voltage $V_{RECT}$ is compared 920 with a minimum voltage $V_{MIN}$ that is allowed to be input to a transformer of the power converter. As long as the sensed voltage $V_{RECT}$ is greater than the voltage threshold $V_{MIN}$ allowed, power is supplied 930 to the transformer from the rectified voltage node by switching a first switch that couples power from the first rectified voltage node to the transformer.

Once the sensed voltage $V_{RECT}$ falls below the voltage threshold $V_{MIN}$, operation of the power converter is changed to supply 940 power to the transformer from a bulk capacitor, such as the capacitor $C_{BULK}$ of FIG. 1, by switching a second switch. The voltage $V_{RECT}$ at the first rectified voltage node is measured 950 again and compared 960 against a second threshold voltage ($V_{MIN}+V_{HYST}$). The hysteresis value $V_{HYST}$ is optional, i.e., may be zero. When included, the hysteresis value $V_{HYST}$ prevents undesirable vacillations between operation using the first rectified voltage node and the bulk capacitor, wherein those vacillations are caused by noise on the measured voltage $V_{RECT}$. As long as the measured voltage $V_{RECT}$ remains below this second threshold voltage ($V_{MIN}+V_{HYST}$), power continues to be supplied 940 from the bulk capacitor $C_{BULK}$.

Once the sensed voltage $V_{RECT}$ rises above the second threshold voltage ($V_{IN}+V_{HYST}$), operation of the power converter is changed to supply 930 power from the first rectified voltage node using the first switch, as described previously.

Such operation continues as long as the power converter is in use. Applying the method 900 of FIG. 9 to a power converter having a rectified voltage as illustrated in FIG. 3A, the transition to use the bulk capacitor and the second switch would occur at time t=T1, when it is detected that the sensed voltage $V_{RECT}$ has fallen to the minimum voltage $V_{MIN}$. The transition back to using the first rectified voltage node and the first switch would occur at time t=T2, when the sensed voltage $V_{RECT}$ has risen to the minimum voltage $V_{MIN}$ plus, optionally, a hysteresis voltage $V_{HYST}$. Such transitions should occur twice per each half-sinusoidally shaped interval of the sensed voltage $V_{RECT}$ at the rectified voltage node.

As used herein, the terms "having," "containing," "including," "comprising," and the like are open-ended terms that indicate the presence of stated elements or features, but do not preclude additional elements or features. The articles "a," "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A power converter, comprising:
   a rectifier configured to input alternating current (AC) power from an input power source and supply power to a rectified voltage node having a rectified voltage;
   a bulk capacitor that is supplied power from the input power source and has a storage voltage;
   a transformer comprising a primary-side winding;
   a first switch configured to provide power to the primary-side winding from the rectified voltage node;
   a second switch configured to provide power to the primary-side winding from the bulk capacitor; and
   a controller configured to:
      sense at least one of the rectified voltage and the storage voltage,
      responsive to detecting that the rectified voltage is decreasing over time and is above a first threshold, switch the first switch while holding the second switch off,
      responsive to detecting that rectified voltage is below the first threshold and is greater than the storage voltage, switch the first switch to provide power to the primary-side winding from the rectified voltage node, and
      responsive to detecting that the rectified voltage is below the first threshold and is lower than the storage voltage, switch the second switch to provide power to the primary-side winding from the bulk capacitor.

2. The power converter of claim 1, wherein the controller is further configured to:
   responsive to detecting that the rectified voltage is increasing over time and that the rectified voltage is greater than a threshold, switch both the first switch and the second switch until it is detected that the rectified voltage is no longer increasing over time.

3. The power converter of claim 1, wherein the controller is further configured to operate in a low-power mode, such that power is supplied to the primary winding from the bulk capacitor for several cycles of the input power source by turning the first switch off and by switching the second switch such that power pulses are supplied to the primary-side winding at no more often than once per cycle of the input power source.

4. The power converter of claim 1, further comprising:
   a current-blocking device coupled to the bulk capacitor and configured to supply power to the bulk capacitor, the current-blocking device additionally coupled to the rectified voltage node or the input power source.

5. The power converter of claim 4, wherein the current-blocking device is a bi-directional switch capable of blocking current flow in both directions.

6. The power converter of claim 5, wherein the bi-directional switch is comprised of two transistors configured in series.

7. The power converter of claim 4, wherein the controller is further configured to control the current-blocking device based upon a measurement of the rectified voltage or a voltage of the input power source, so as to only allow current to be conducted to the bulk capacitor in response to detecting that the measured rectified voltage or measured input power source voltage is below a maximum allowed voltage of the bulk capacitor, and so as to not allow current to be conducted from the bulk capacitor to the rectified voltage node or input power source.

8. The power converter of claim 5, wherein the controller is further configured to operate in a low-power mode,
such that power is supplied to the primary winding from the bulk capacitor for several cycles of the input power source by turning the first switch off and by switching the second switch such that energy pulses are supplied to the primary winding at no more often than once per cycle of the input power source, and
wherein the bi-directional switch is controlled to ensure the source voltage is below a low-power source voltage threshold, by measuring the rectified voltage or a voltage of the input power source, and turning the bi-directional switch on responsive to detecting that the measured voltage is within a low-power voltage range.

9. The power converter of claim 1,
wherein the power converter has an output power rating in Watts, and
wherein the bulk capacitor has a capacitance of 1.0 to 1.4 µF per Watt of the output power rating.

10. A method of controlling a power converter that includes a rectifier configured to input alternating current (AC) power from an input power source and supply power to a rectified voltage node having a rectified voltage node, a bulk capacitor that is supplied power from the input power source and has a storage voltage, a transformer comprising a primary-side winding, a first switch configured to provide power to the primary-side winding from the rectified voltage node, and a second switch configured to provide power to the primary-side winding from the bulk capacitor, the method comprising:
sensing at least one of the rectified voltage and the storage voltage;
responsive to detecting that the rectified voltage is decreasing over time and is above a first threshold, switching the first switch while holding the second switch off;
responsive to detecting that the rectified voltage is below the first threshold and is greater than the storage voltage, switching the first switch to provide power to the primary-side winding from the rectified voltage node, and
responsive to detecting that the rectified voltage is below the first threshold and is lower than the storage voltage, switching the second switch to provide power to the primary-side winding from the bulk capacitor.

11. The method of claim 10, further comprising:
responsive to detecting that the rectified voltage is increasing over time and that the rectified voltage is greater than a threshold, switching both the first switch and the second switch until it is detected that the rectified voltage is no longer increasing over time.

12. The method of claim 10, further comprising:
detecting that a load of the power converter requires power below a low-power threshold, and entering a low-power mode of the power converter;
switching, for a plurality of cycles of the input power source during the low-power mode, the second switch such that power pulses are supplied to the primary-side winding at a rate no more often than once per cycle of the input power source, so as to supply power to the primary-side winding from the bulk capacitor; and
turning off the first switch for the plurality of cycles of the input power source.

13. The method of claim 10, wherein the power converter further comprises a bi-directional switch configured to block current flow in both directions and configured to supply power to the bulk capacitor from at least one of the rectified voltage node and the input power source, the method further comprising:
sensing at least one of the rectified voltage and a voltage of the input power source;
detecting that the measured rectified voltage or the measured input power source voltage is above a maximum allowed voltage of the bulk capacitor;
responsive to said detecting, holding the bi-directional switch in the off position such that it does not conduct, so as to prevent the storage voltage of the bulk capacitor from being above the maximum allowed voltage.

14. The method of claim 10, wherein the power converter further comprises a bi-directional switch configured to block current flow in both directions and configured to supply power to the bulk capacitor from a capacitor source that is at least one of the rectified voltage node and the input power source, the method further comprising:
detecting that a load of the power converter requires power below a low-power threshold, and entering a low-power mode of the power converter; and
during the low-power mode:
turning the first switch off such that it does not conduct;
switching the second switch such that energy pulses are supplied to the primary-side winding at a rate no more often than once per cycle of the input power source;
measuring a voltage of the capacitor source; and
turning on the bi-directional switch responsive to detecting that the voltage of the capacitor source is within a low-power source voltage range, thereby charging the bulk capacitor.

* * * * *